US008602392B2

(12) United States Patent
Arghami Nia

(10) Patent No.: US 8,602,392 B2

(45) Date of Patent: Dec. 10, 2013

(54) JACK ASSEMBLY FOR RAISING AND LOWERING VEHICLES

(76) Inventor: Hossein Arghami Nia, Shiraz (IR)

( * ) Notice: Subject to any disclaimer, the term of this patent is extended or adjusted under 35 U.S.C. 154(b) by 355 days.

(21) Appl. No.: 12/948,853

(22) Filed: Nov. 18, 2010

(65) Prior Publication Data

US 2011/0155978 A1 Jun. 30, 2011

(51) Int. Cl.
*B65G 7/00* (2006.01)

(52) U.S. Cl.
USPC ............................ 254/127; 254/122; 254/124

(58) Field of Classification Search
USPC .............. 254/127, 122, 126, 124, 134, 133 R
See application file for complete search history.

(56) References Cited

U.S. PATENT DOCUMENTS

| | | | | |
|---|---|---|---|---|
| 4,585,212 A * | 4/1986 | Yanker | 254/122 |
| 5,876,526 A * | 3/1999 | Hamade et al. | 152/416 |
| 6,375,161 B2 * | 4/2002 | Garceau | 254/126 |
| 7,159,849 B2 * | 1/2007 | Raynor | 254/126 |
| 7,413,056 B2 * | 8/2008 | Gonzi et al. | 187/269 |
| 8,052,121 B2 * | 11/2011 | Christie | 254/122 |
| 2011/0155978 A1 * | 6/2011 | Arghami Nia | 254/127 |

* cited by examiner

*Primary Examiner* — Lee D Wilson
(74) *Attorney, Agent, or Firm* — Barry Choobin

(57) ABSTRACT

The various embodiments herein provide a jack assembly for raising and lowering the vehicles. The assembly comprises a base sheet mounted with two lower arms, a retentive sheet mounted with two upper arms and two shafts. The two upper arms are pivotably connected to the lower arms respectively through the two shafts. A wire rope is passed over a groove provided on a plurality of pulleys rotatably mounted on one of the two shafts. A spanner and a jack handle are provided respectively on the two shafts. When the jack handle is pulled up, the two ends of wire ropes move towards each other to make the two shafts to approach towards each other thereby displacing the lower arms and upper arms to lift the retentive sheet for raising the vehicles with a single pull movement of the jack handle.

19 Claims, 15 Drawing Sheets

JACK ASSEMBLY FOR RAISING AND LOWERING VEHICLES

BACKGROUND

1. Technical Field

The embodiments herein generally relates to a jack assembly for raising and lowering a vehicle. The embodiments herein more particularly relate to a one beat jack assembly to raise the vehicles.

2. Description of the Related Art

Often, there exists hassle for serious injury involved with jacking up a vehicle along the side of the road. There can be trouble in getting the jack assembled and placing the jack under the frame or axle of a vehicle. There also exists a possibility of injuring the hands or fingers of an operator while operating the jack. Moreover, there involves a safety concern of a vehicle falling off the jack, while the tire is being changed during a raising or lowering operation of the vehicle.

Hence there is a need for a jack assembly for raising and lowering a body without a need for providing a large amount of force from an individual to operate the jack assembly.

The abovementioned shortcomings, disadvantages and problems are addressed herein and which will be understood by reading and studying the following specification.

OBJECTS OF THE EMBODIMENTS

The primary object of the embodiments herein is to provide a jack assembly for raising or lowering body of a vehicle with a single movement of the jack.

Another object of the embodiments herein is to provide a jack assembly without requiring a large amount of force from an individual to operate the jack assembly.

Yet another object of the embodiments herein is to provide a jack assembly which is used under all parts of a vehicle body without any body force or proficiency.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a jack assembly for raising and lowering a vehicle. The jack assembly comprises at least two shafts, a base sheet and a retentive sheet. At least two upper arms are fastened to the retentive sheet and at least two lower arms are fastened to the base sheet. A spanner is provided on one of the at least two shafts. A plurality of pulleys are provided on one of the at least two shafts. A groove is provided on each of the plurality of pulleys. A jack handle or closed holder lever is provided on one of the at least two shafts. A plurality of wire ropes is passed over each of the plurality of pulleys. When the jack handle is pulled up, the two ends of wire ropes are moved towards each other and the at least two shafts are moved to approach each other thereby displacing the at least two lower arms and the at least two upper arms to lift the retentive sheet to raise the vehicles with a single pull movement of the jack handle.

According to one embodiment herein, a first end of the wire ropes is attached to the spanner and a second end of the wire ropes passed over the groove in the pulleys is fastened to the jack handle. The jack assembly also includes a moving part. A hole is provided in the jack assembly through which the moving part moves. A winding regulation screw is provided in the moving part. A tail piece is attached to one of the at least two shafts associated with the jack handle and provided with an opening. The second end of the wire ropes is attached by a girth to the tailpiece through the opening. The at least two shafts comprises either a shift or ball bearing for easy movement of the at least two upper arms and the at least two lower arms in the jack assembly. A plurality of rakes are provided on one of the at least two shafts.

A first hole is provided at one end of the at least two upper arms for placing the shift or the ball bearing. A second hole is provided at another end of each of the at least two upper arms for fastening each of the at least two upper arms to the retentive sheet. The at least two upper arms are fastened to the retentive sheet through at least two junction pins respectively.

A third hole is provided at one end of each of the at least two lower arms for placing the shift or the ball bearing and a fourth hole is provided at another end of each of the at least two lower arms for fastening each of the at least two upper arms to the base sheet. The at least two lower arms are fastened to the base sheet through at least two junction pins respectively.

The at least two upper arms are a first upper arm and a second upper arm and the at least two lower arms are a first lower arm and a second lower arm. The first upper arm and the first lower arm are attached to each other and pivoted on one of the at least two shafts. The second upper arm and the second lower arm are attached to each other and pivoted on one of the at least two shafts. Each of the at least two upper arms and each of the at least two lower arms are provided with at least two holes.

The jack assembly further comprises a first spring and a second spring. The second spring is a closed holding spring. A handle forming junction for the first spring and the second spring is provided in the jack assembly. A closed holding handle is attached to the first spring and to one of the at least two junction pins associated with the lower arms. The second spring is attached to the closed holding handle and to one of the at least two pins associated with the upper arms.

Further, the jack assembly comprises a rattle assembly, a rattle lock, a third spring and a retentive holder. A rattle is arranged with the rattle lock. The third spring collector spring is provided in the rattle lock. According to one embodiment, the third spring is a collector spring. One end of the third spring is attached to the rattle lock and the other end of the third spring is attached to the closed holding handle. The rattle lock is connected to the retentive holder through a retentive holding pin.

According to the embodiments herein, a jack assembly is provided with different numbers of pulleys for achieving different powers. The power of the jack assembly depends on the number of pulleys provided in the jack assembly. For example, in the jack assembly involving a single pulley, the power of each pulley is equal to 2 regardless of the power of the jack handle and then the power of jack assembly is equal to 3 (1+2=3). Further considering the power of the jack handle, the power of jack assembly is equal to 30 (1+2×10=30). Thus, it is understood easily that the power of jack assembly including two pulleys is equal to 50

(2×2+1×10=50) based on the above principle. Similarly the power of jack assembly including three pulleys is equal to 90 (2×2×2+1×10=90), the power of jack assembly including four pulleys is equal to 170 (2×2×2×2+1×10=170) and the power of jack assembly including five pulleys is equal to 330 (2×2×2×2×2+1×10=330).

According to the embodiments herein, the jack assemblies involving high power are used in heavy vehicles. The numbers of pulleys vary considerably between a single pulley to seven pulleys depending on the power required by the jack assembly. According to requirement of the size and power of the jack assembly the length of the wire ropes vary considerably in the jack assembly. The selection of the tailpiece with respect to the size depends on the power and size required in the jack assembly. According to the embodiments herein, a sling or a hoop and rope is provided on the pulleys instead of wire ropes.

BRIEF DESCRIPTION OF THE DRAWINGS

The other objects, features and advantages will occur to those skilled in the art from the following description of the preferred embodiment and the accompanying drawings in which.

Figure 1:
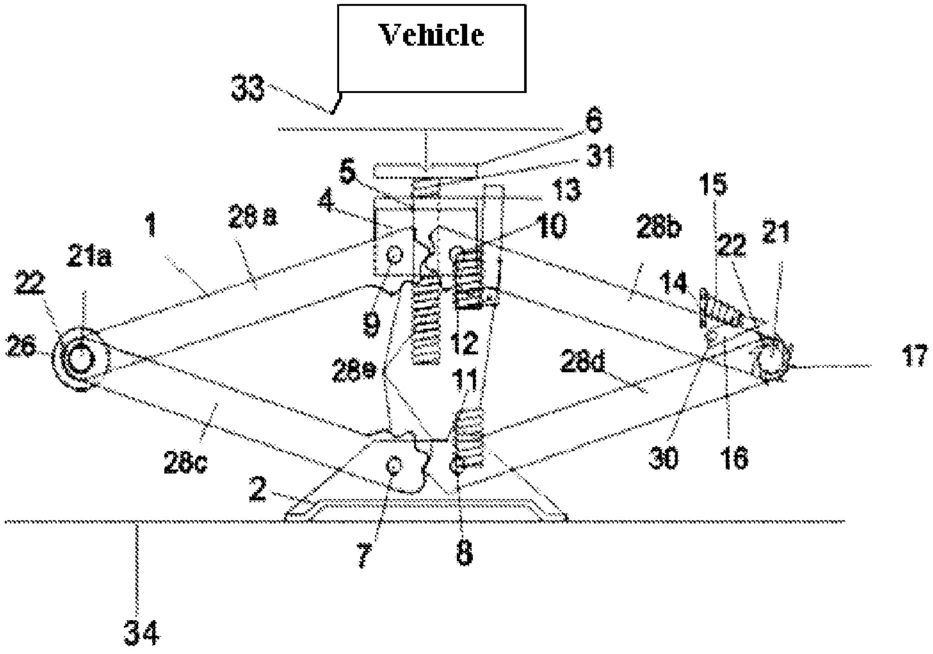
FIG. 1 illustrates a side view of a partial jack assembly according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a jack assembly for raising and lowering a vehicle. The jack assembly comprises at least two shafts, a base sheet a retentive sheet. A spanner is provided on one of the at least two shafts. The assembly also includes at least two upper arms fastened to the retentive sheet and at least two lower arms fastened to the base sheet. A plurality of pulleys are provided on one of the at least two shafts. A groove is provided on each of the plurality of pulleys. A jack handle is provided on one of the at least two shafts and a plurality of wire ropes are provided on each of the plurality of pulleys. When the jack handle is pulled the wire ropes associated with each of the plurality of the pulleys moves and the at least two shafts approaches each other further, the at least two upper arms fastened to the retentive sheet are lifted for raising the vehicles with a single pull of the jack handle.

According to one embodiment herein first end of the wire ropes is attached to the spanner and second end of the wire ropes is attached to the groove is fastened to the jack handle. The jack assembly also includes a moving part. A hole is provided in the jack assembly through which the moving part moves. A winding regulation screw is provided in the moving part. A tail piece is attached to one of the at least two shafts associated with the jack handle. First end of the wire ropes is attached to the spanner and second end of the wire ropes is attached by a girth to the tailpiece through an opening provided in the tailpiece. The at least two shafts comprises one of a shift or ball bearing for easy movement of the at least two upper arms and the at least two lower arms in the jack assembly. A plurality of rakes are provided on one of the at least two shafts A first hole is provided at one end of the at least two upper arms for placing the shift or the ball bearing. A second hole is provided at another end of each of the at least two upper arms for fastening each of the at least two upper arms to the retentive sheet. The at least two upper arms are fastened to the retentive sheet through at least two junction pins respectively.

A third hole is provided at one end of each of the at least two lower arms for placing the shift or the ball bearing and a fourth hole is provided at another end of each of the at least two lower arms for fastening each of the at least two upper arms to the base sheet. The at least two lower arms are fastened to the base sheet through at least two junction pins respectively.

The at least two upper arm are a first upper arm and a second upper arm and the at least two lower arms are a first lower arm and a second lower arm. The first upper arm and the first lower arm are attached to each other and pivoted on one of the at least two shafts. The second upper arm and the second lower arm are attached to each other and pivoted on one of the at least two shafts. Each of the at least two upper arms and each of the at least two lower arms are provided with at least two holes.

The jack assembly further comprises a first spring and a second spring. The second spring is a closed holding spring. A handle forming junction for the first spring and the second spring is provided in the jack assembly. The first spring is attached to a closed holding handle and one of the at least two pins associated with the lower arms. The second spring is attached to a closed holding handle and one of the at least two pins associated with the upper arms.

Further, the jack assembly comprises a rattle assembly, a rattle lock, a third spring and a retentive holder. A rattle is arranged with the rattle lock. The third spring collector spring is provided in the rattle lock. According to one embodiment, the third spring is a collector spring. One end of the third spring is attached to the rattle lock and the other end of the third spring is attached to the closed holding handle. The rattle lock is connected to the retentive holder through a retentive holding pin.

According to the embodiments herein, a jack assembly is provided with different numbers of pulleys for achieving different powers. The power of the jack assembly depends on the number of pulleys provided in the jack assembly. For example, in the jack assembly involving a single pulley, the power of each pulley is equal to 2 regardless of the power of the jack handle and then the power of jack assembly is equal to 3 (1+2=3). Further considering the power of the jack handle, the power of jack assembly is equal to 30 (1+2×10=30). Thus, it is understood easily that the power of jack assembly including two pulleys is equal to 50 (2×2+1×10=50) based on the above principle. Similarly the power of jack assembly including three pulleys is equal to 90 (2×2×2+1×10=90), the power of jack assembly including four pulleys is equal to 170 (2×2×2×2+1×10=170) and the power of jack assembly including five pulleys is equal to 330 (2×2×2×2×2+1×10=330).

According to the embodiments herein, the jack assemblies involving high power are used in heavy vehicles. The numbers of pulleys vary considerably between a single pulley to seven pulleys depending on the power required by the jack assembly. According to requirement of the size and power of the jack assembly the length of the wire ropes vary considerably in the jack assembly. The selection of the tailpiece with respect to the size depends on the power and size required in the jack assembly. According to the embodiments herein, a sling or a hoop and rope is provided on the pulleys instead of wire ropes.

FIG. 1 illustrates a side view of a jack assembly according to one embodiment herein. With respect to FIG. 1, the jack assembly 1 is placed under a vehicle body 33 on a ground 34 and fixed to the vehicle body 34. The jack assembly includes a first upper arm **28*a* and a second upper arm 28*b* attached to a retentive sheet 4. The first upper arm 28*a* is attached to the retentive sheet 4 through a pin 9 and the second upper arm 28*b* is attached to the retentive sheet 4 through the pin 10. The retentive sheet includes a moving part 6 adapted to maneuver through a hole 5. The moving part 6 is provided with a winding regulation screw 31 in form of a thread which is been attached to the vehicle body providing height adjustment for the jack assembly 1** during raising and lowering the vehicle body. At least one of the first upper arm and the second lower arm used are of same size.

The jack assembly 1 is remained stable in position until the retentive sheet 4 along with the part 6 is completely attached to the vehicle body. Also, the jack assembly includes a first lower arm **28*c* and a second lower arm 28*d*. The first lower arm 28*c* and the second lower arm 28*d* are pivoted to a base sheet 2 through pin 7 and pin 8. The base sheet 2 is placed under the vehicle body 33 on the ground 34. The first upper arm 28*a* and the first lower arm 28*c* are attached to each other and pivoted on a shaft 21. Similarly the second upper arm 28*b* and the second lower arm 28*d* are attached to each other and pivoted on a shaft 21*a*. The arms 28*a*, 28*b*, 28*c* and 28*d* provided with bumps 28*e* provided on the arms which enables the arms 28*a*, 28*b*, 28*c* and 28*d* to move up equally during movement of the jack assembly. The shaft 21 and shaft 21*a*** are intermediate shafts provided in the jack assembly.

Figure 4:
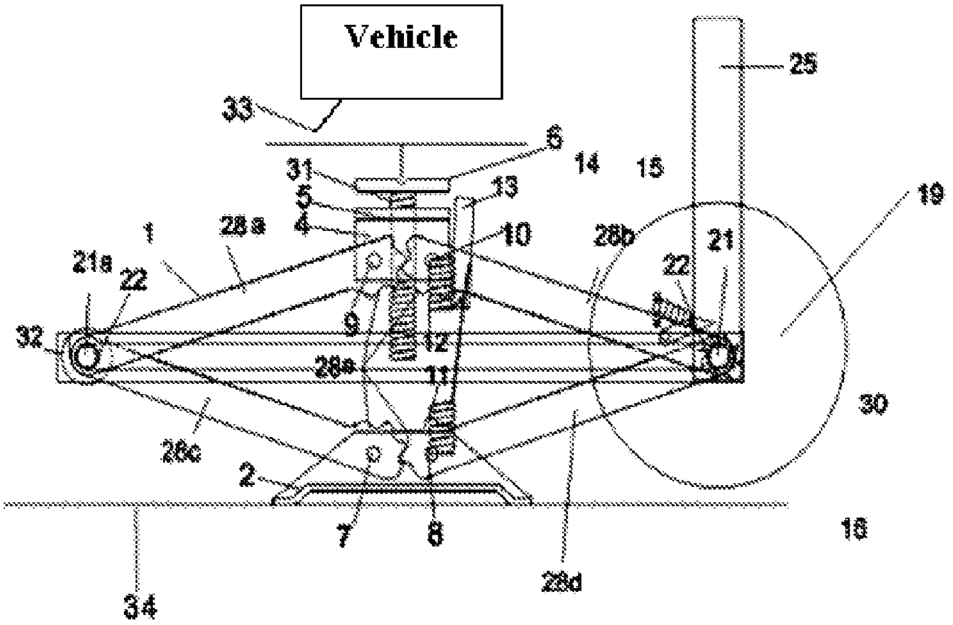
FIG. 4 illustrates side view of the partial jack assembly along with a jack handle according to one embodiment herein.
Figure 8:
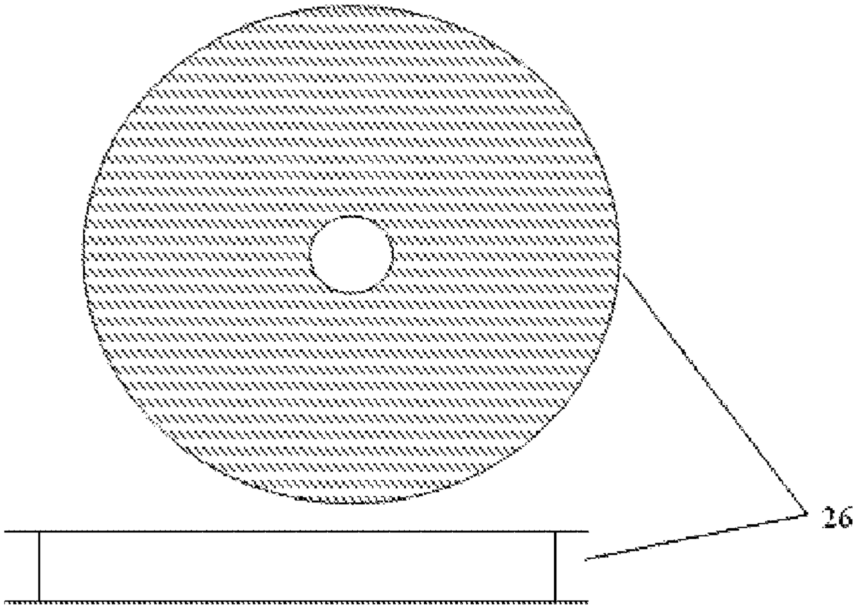
FIG. 8 illustrates a front view and top view of pulley provided in the partial jack assembly according to one embodiment herein.
Figure 10:
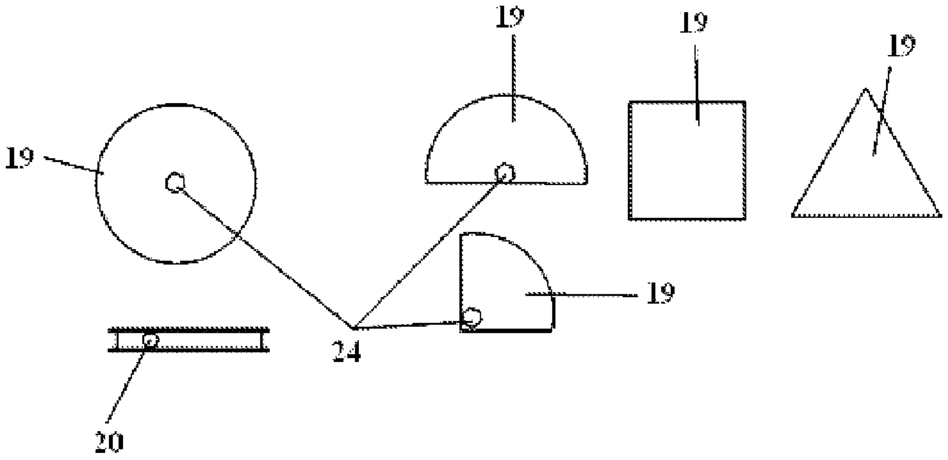
FIG. 10 illustrates a schematic view of the ends of the tailpiece included in the jack assembly according to one embodiment herein.

The jack assembly 1 further includes a jack handle 25 (as shown in FIG. 4), a plurality of pulleys 26 (as shown in FIG. 8) on each of the shaft 21 and shaft **21*a*. The other end of the shaft 21 and 21*a* is attached to a tail piece (as shown in 4). The tail piece 19 includes a hole 20 (as shown in FIG. 10) for holding a plurality of wire ropes. When the jack handle 25 (as shown in FIG. 4) is pulled for the first time, the shaft 21 revolves which in turn causes the tail piece 19 to revolve and pull the wire ropes. Following the revolving action of the tail piece 19, the pulley 26 moves, and the shaft 21 and the shaft 21*a* approach each other wresting the arms 28*a*, 28*b*, 28*c*, and 28*d*. Further due to wresting of the arms 28*a*, 28*b*, 28*c*, 28*d*, the base sheet 2 and the retentive sheet 4** recedes from each other causing the jack assembly to rise.

The jack assembly also includes a spring 11, a closed holding spring 12, a handle 13 and a closed holding handle 14. The spring 11 is attached to the pin 8 and the closed holding handle 14 to keep the jack assembly 1 closed. The closed holding spring 12 is attached to the pin 10 and the closed holding handle 14 of the jack assembly 1 from both sides. The handle 13 forms a junction for the spring 11 and the closed holding spring 12. Further, the jack assembly 1 includes a rattle assembly comprising of a rattle lock 16, a rattle 17 associated with the rattle lock 16 and a collector spring 15 associated with the rattle lock 16.

The collector spring 15 is attached to the lock 16 and the closed holding handle 14 from two ends. When the jack handle 25 (as shown in FIG. 4) is pulled, the shaft 21 revolves which in turn revolves the rattle 17 thereby stopping the movement of the jack handle 25 which in turn stops the rotation of the rattle 17. The rattle lock 16 fixes the jack assembly 1 by fixing the rattle 17 in its place. Furthermore when the closed holding handle 14 recedes the collector spring gets activated. When the jack handle 25 is pulled second time the rattle lock 16 rises and releases the rattle 17 and brings the jack assembly 1 to its initial position.

Figure 2:
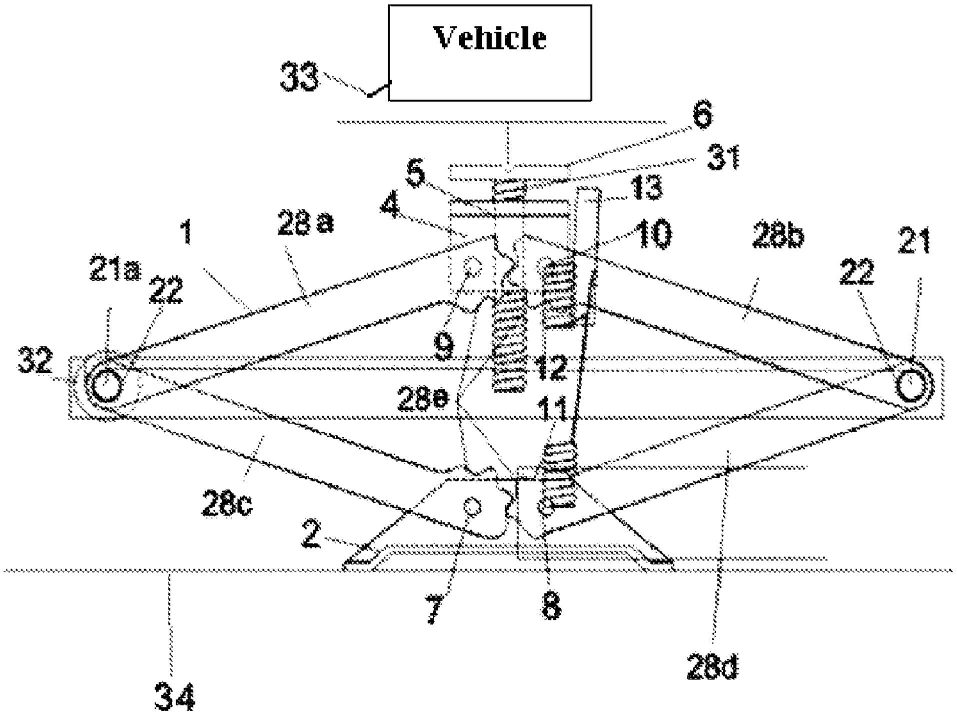
FIG. 2 illustrates a side view of a partial jack assembly without a rattle assembly according to one embodiment herein.

FIG. 2 illustrates a side view of a jack assembly without a rattle assembly according to one embodiment herein. With respect to FIG. 2, the jack assembly 1 is placed under a vehicle body 33 on a ground 34 and attached to the vehicle body. One movement jack assembly 1 includes a first upper arm **28*a* and a second upper arms 28*a* 28*b* attached to a retentive sheet 4. The first upper arm 28*a* and second upper arm 28*b* are attached to the retentive sheet 4 through pin 9 and pin 10. The retentive sheet includes part 6 moving through a hole 5. The part 6 is provided with a winding regulation screw 31** in form of a thread which is been attached to the vehicle body providing height adjustment for the jack assembly during rising and lowering the vehicle body.

The jack assembly is remained stable in position until the part 6 is completely attached the vehicle body. Also, the jack assembly includes a first lower arm **28*c* and a second lower arm 28*d*. The first lower arm 28*c* and the second lower arm 28*d* are attached or pivoted to a base sheet 2 through pin 7 and pin 8. The base sheet 2 on the ground 34 is placed lower the vehicle body 33. The first upper arm 28*a* and the first lower arm 28*c* are attached to each other and pivoted on a shaft 21*a*, similarly the second upper arm 28*b* and the second lower arm 28*d* are attached to each other and pivoted on a shaft 21*a***.

Bumps 28*e* provided on the arms 28*a*, 28*b*, 28*c* and 28*d* help arms go up equally during movement of the jack assembly.

Figure 3:
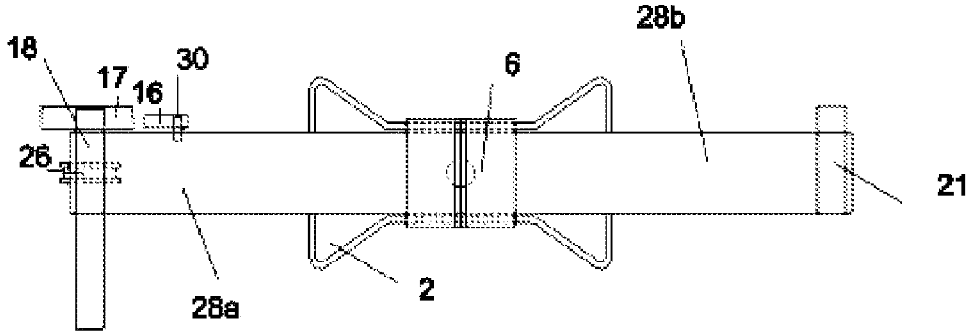
FIG. 3 illustrates a top view of the partial jack assembly according to one embodiment herein.

FIG. 3 illustrates a top view of jack assembly according to one embodiment herein. With respect to FIG. 3, the jack assembly 1 includes a first upper arm 28*a* attached to a retentive sheet 4. The first upper arm 28*a* and second upper arm 28*b* are attached to the retentive sheet 4 through pin 9 and pin 10 (as shown in FIG. 1). The retentive sheet includes part 6 moving through a hole 5 (as shown in FIG. 1).

The figure includes pulley 26 attached to a shaft 18 associated with the jack handle 25 (as shown in FIG. 1). The jack assembly also includes a rattle lock 16, a rattle 17 associated with the rattle lock 16. The rattle 17 forming the part of the rattle lock 16 is connected to the shaft 18. The rattle lock 16 is attached to holder base of the jack handle 25 through a retentive holding pin 30. The jack assembly is remained stable in position until the part 6 is completely attached the vehicle body.

FIG. 4 illustrates side view of jack assembly along with jack handle according to one embodiment herein. With respect to FIG. 4 the jack assembly 1 includes a first upper arm 28*a* and a second upper arms 28*a* 28*b* attached to a retentive sheet 4. The first upper arm 28*a* and second upper arm 28*b* are attached to the retentive sheet 4 through pin 9 and pin 10. The retentive sheet includes part 6 moving through a hole 5. The part 6 is provided with a winding regulation screw 31 in form of a thread which is been attached to the vehicle body providing height adjustment for the jack assembly during rising and lowering the vehicle body.

The jack assembly is remained stable in position until the part 6 is completely attached the vehicle body. Also, the jack assembly includes a first lower arm 28*c* and a second lower arm 28*d*. The first lower arm 28*c* and the second lower arm 28*d* are attached or pivoted to a base sheet 2 through pin 7 and pin 8. The base sheet 2 on the ground 34 is placed under the vehicle body 33. The first upper arm 28*a* and the first lower arm 28*c* are attached to each other and pivoted on a shaft 21*a*, similarly the second upper arm 28*b* and the second lower arm 28*d* are attached to each other and pivoted on a shaft 21*a*. Bumps 28*e* provided on the arms 28*a*, 28*b*, 28*c* and 28*d* help arms go up equally during movement of the jack assembly.

Further the jack assembly 1 includes a jack handle 25 (as shown in FIG. 4), plurality of pulleys 26 (as shown in FIG. 8) on each of the shaft 21 and shaft 21*a*. The other end of the shaft 21 and 21*a* is attached to a tail piece 19 (as shown in 4). The tail piece 19 includes a hole 20 (as shown in FIG. 10) for holding plurality of wire ropes. When the jack handle 25 (as shown in FIG. 4) is pulled for the first time the shaft 21 revolves which in turn causes the tail piece 19 to revolve and pull the wire ropes. Following the revolving action of the tail piece 19 the pulley 26 moves and the shaft 21 and the shaft 21*a* approach each other wresting the arms 28*a*, 28*b*, 28*c*, and 28*d*. Further due to wresting of the arms 28*a*, 28*b*, 28*c*, 28*d* the base sheet 2 and the retentive sheet 4 recedes from each other causing the jack assembly to rise.

The jack assembly also includes a spring 11, a closed holding spring 12, a handle 13 and a closed holding handle 14. The spring 11 is attached to the pin 8 and the closed holding handle 14 keeping the jack assembly 1 closed. The one end of the spring is attached to the pin 10 and other end of the spring is attached to the closed holding handle 14 of the jack assembly. The handle 13 forms junction for the spring 11 and the closed holding spring 12. Further, the jack assembly 1 includes a rattle assembly comprising of a rattle lock 16, a rattle 17 associated with the rattle lock 16, a collector spring 15 associated with the rattle lock 16.

The collector spring 15 is attached to the lock 16 and the closed holding handle 14 from two ends. When the jack handle 25 (as shown in FIG. 4) is pulled the shaft 21 revolves which in turn revolves the rattle 17 stopping the jack handle 25 Following the stopping action of the jack handle 25 the rattle 17 also stops. The rattle lock 16 fixes the jack assembly 1 by fixing the rattle 17 in its place. Furthermore when the closed holding handle 14 recedes the collector spring gets activated. When the jack handle 25 is pulled second time the rattle lock 16 rises and releases the rattle 17 bringing the jack assembly 1 to its initial position. The rattle lock 16 is attached to holder base of the jack handle 25 through a pin 30. The jack assembly is remained stable in position until the part 6 is completely attached the vehicle body.

Figure 5:
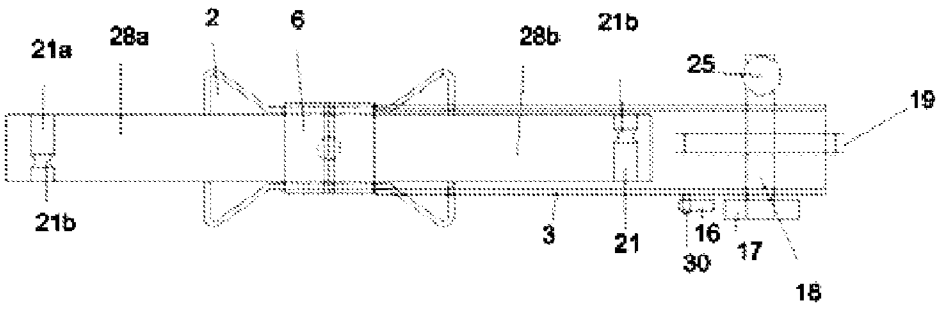
FIG. 5 illustrates a top view of the partial jack assembly according to one embodiment herein.

FIG. 5 illustrates a top view of jack assembly according to one embodiment herein. With respect to FIG. 5 W, the jack assembly 1 includes a first upper arm 28*a* and a second upper arm 28*b* attached to a retentive sheet 4 (as shown in FIG. 1). The first upper arm 28*a* and second upper arm 28*b* are attached to the retentive sheet 4 through pin 9 and pin 10 (as shown in FIG. 1). The retentive sheet includes part 6 moving through a hole 5 (as shown in FIG. 1). A retentive jack holder 3 is fixed on the base sheet 2 through pins 7 and 8 (as shown in FIG. 1).

The figure includes a rake 21*b* which provided instead of a pulley 26 *a*. in various embodiments of the present invention the total number of rakes created on the shaft 21 depends on need of a user. With creating of each of the rake 21*b* the number of usage of pulleys 26 in the jack assembly 1 reduces. The jack assembly also includes a rattle lock 16, a rattle 17 associated with the rattle lock 16. The rattle 17 forming the part of the rattle lock 16 is connected to a shaft 18 of jack handle 25. The rattle lock 16 is connected to the retentive holder 3 through the pin 30. The jack assembly is remained stable in position until the part 6 is completely attached the vehicle body. The figure also shows a tail piece 19. The tail piece 19 includes a hole 20 (as shown in FIG. 10) for holding plurality of wire ropes.

Figure 6:
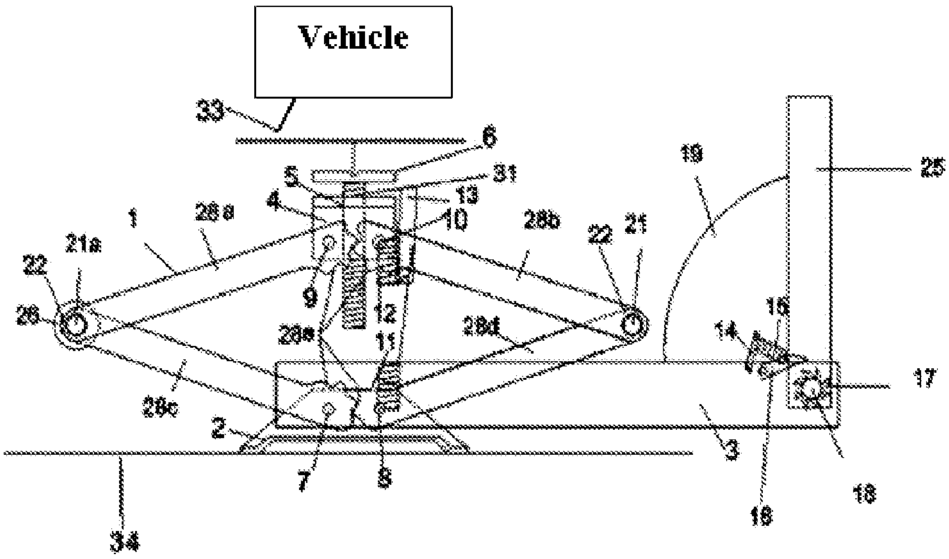
FIG. 6 illustrates a side view of jack assembly according to one embodiment herein.

FIG. 6 illustrates side view of jack assembly according to one embodiment herein. With respect to FIG. 6. The jack assembly 1 is placed under a vehicle body 33 on a ground 34 and attached to the vehicle body. One movement jack assembly 1 includes a first upper arm 28*a* and a second upper arms 28*a* 28*b* attached to a retentive sheet 4. The first upper arm 28*a* and second upper arm 28*b* are attached to the retentive sheet 4 through pin 9 and pin 10. The retentive sheet includes part 6 moving through a hole 5. The part 6 is provided with a winding regulation screw 31 in form of a thread which is been attached to the vehicle body providing height adjustment for the jack assembly during rising and lowering the vehicle body. A retentive jack holder 3 is fixed on the base sheet 2 through pins 7 and 8.

The jack assembly is remained stable in position until the part 6 is completely attached the vehicle body. Also, the jack assembly includes a first lower arm 28*c* and a second lower arm 28*d*. The first lower arm 28*c* and the second lower arm 28*d* are attached or pivoted to a base sheet 2 through pin 7 and pin 8. The base sheet 2 on the ground 34 is placed under the vehicle body 33. The first upper arm 28*a* and the first lower arm 28*c* are attached to each other and pivoted on a shaft 21*a*, similarly the second upper arm 28*b* and the second lower arm 28*d* are attached to each other and pivoted on a shaft 21*a*. Bumps 28*e* provided on the arms 28*a*, 28*b*, 28*c* and 28*d* help arms go up equally during movement of the jack assembly.

Further the jack assembly 1 includes a jack handle 25, two shafts a shaft 21 and shaft 21*a*. Each of the shaft 21 and 21*a* includes a shift 22 for easy movements of the upper arms 28*a*,

28*b* and lower arms 28*c* and 28*d*. The other end of the shaft 21 and 21*a* is attached to a tail piece 19. The tail piece 19 includes a hole 20 (as shown in FIG. 10) for holding plurality of wire ropes. When the jack handle 25 is pulled for the first time the shaft 21 revolves which in turn causes the tail piece 19 to revolve and pull the wire ropes. Following the revolving action of the tail piece 19 the rake 21*b* (as shown in FIG. 5) moves, and the shaft 21 and the shaft 21*a* approach each other wresting the arms 28*a*, 28*b*, 28*c*, and 28*d*. Further due to wresting of the arms 28*a*, 28*b*, 28*c*, 28*d* the base sheet 2 and the retentive sheet 4 recedes from each other causing the jack assembly 1 to rise.

The jack assembly also includes a spring 11, a closed holding spring 12, a handle 13 and a closed holding handle 14. The spring 11 is attached to the pin 8 and the closed holding handle 14 keeping the jack assembly 1 closed. The spring is attached to the pin 10 and the closed holding handle 14 of the jack assembly 1 from both sides. The handle 13 forms junction for the spring 11 and the spring 12. Further, the jack assembly 1 includes a rattle assembly comprising of a rattle lock 16, a rattle 17 associated with the rattle lock 16, a collector spring 15 associated with the rattle lock 16. The rattle lock 16 is connected to the retentive holder 3 through the pin 30.

The collector spring 15 is attached to the rattle lock 16 and the closed holding handle 14 from two ends. When the jack handle 25 is pulled the shaft 21 revolves which in turn revolves the rattle 17 stopping the jack handle 25. Following the stopping action of the jack handle 25 the rattle 17 also stops. The rattle lock 16 fixes the jack assembly 1 by fixing the rattle 17 in its place. Furthermore when the closed holding handle 14 recedes the collector spring gets activated. When the jack handle 25 is pulled second time the rattle lock 16 rises and releases the rattle 17 bringing the jack assembly 1 to its initial position.

Figure 7:
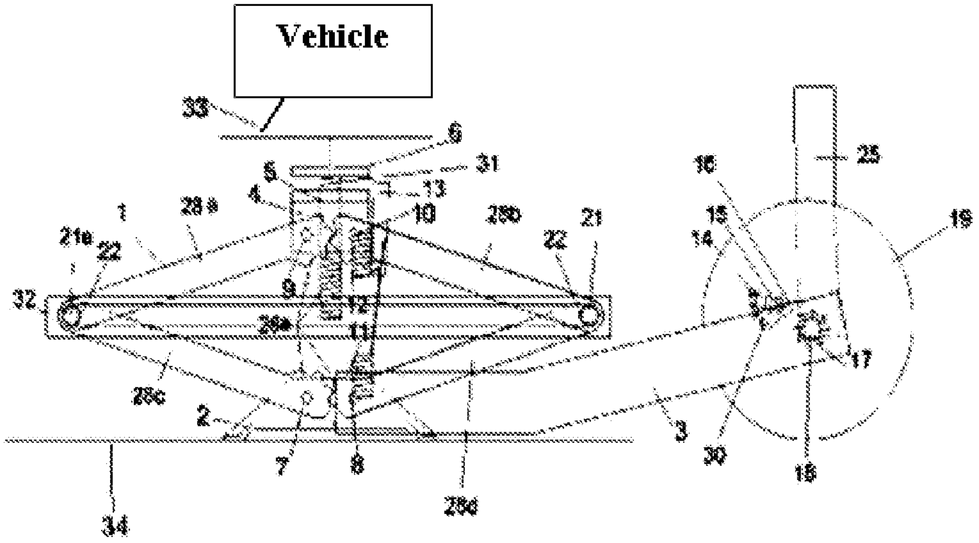
FIG. 7 illustrates a side view of the jack assembly including a bent retentive holder according to one embodiment herein.

FIG. 7 illustrates a side view of jack assembly including a bent retentive holder according to one embodiment herein. With respect to FIG. 7. The jack assembly 1 is placed under a vehicle body 33 on a ground 34 and attached to the vehicle body. One movement jack assembly 1 includes a first upper arm 28*a* and a second upper arms 28*a* 28*b* attached to a retentive sheet 4. The first upper arm 28*a* and second upper arm 28*b* are attached to the retentive sheet 4 through pin 9 and pin 10. The retentive sheet includes part 6 moving through a hole 5. The part 6 is provided with a winding regulation screw 31 in form of a thread which is been attached to the vehicle body providing height adjustment for the jack assembly during rising and lowering the vehicle body. A bent retentive jack holder 3 is fixed on the base sheet 2 through pins 7 and 8.

The jack assembly is remained stable in position until the part 6 is completely attached the vehicle body. Also, the jack assembly includes a first lower arm 28*c* and a second lower arm 28*d*. The first lower arm 28*c* and the second lower arm 28*d* are attached or pivoted to a base sheet 2 through pin 7 and pin 8. The base sheet 2 on the ground 34 is placed under the vehicle body 33. The first upper arm 28*a* and the first lower arm 28*c* are attached to each other and pivoted on a shaft 21*a*, similarly the second upper arm 28*b* and the second lower arm 28*d* are attached to each other and pivoted on a shaft 21*a*. Bumps 28*e* provided on the arms 28*a*, 28*b*, 28*c* and 28*d* help arms go up equally during movement of the jack assembly.

Further the jack assembly 1 includes a jack handle 25, two shafts a shaft 21 and shaft 21*a*. Each of the shaft 21 and 21*a* includes a shift 22 for easy movements of the upper arms 28*a*, 28*b* and lower arms 28*c* and 28*d*. The other end of the shaft 21 and 21*a* is attached to a tail piece 19. The tail piece 19 includes a hole 20 (as shown in FIG. 10) for holding plurality of wire ropes. When the jack handle 25 is pulled for the first time the shaft 21 revolves which in turn causes the tail piece 19 to revolve and pull the wire ropes. Following the revolving action of the tail piece 19 the rake 21*b* (as shown in FIG. 5) moves, and the shaft 21 and the shaft 21*a* approach each other wresting the arms 28*a*, 28*b*, 28*c*, and 28*d*. Further due to wresting of the arms 28*a*, 28*b*, 28*c*, 28*d* the base sheet 2 and the retentive sheet 4 recedes from each other causing the jack assembly 1 to rise.

The jack assembly also includes a spring 11, a closed holding spring 12, a handle 13 and a closed holding handle 14. The spring 11 is attached to the pin 8 and the closed holding handle 14 keeping the jack assembly 1 closed. The closed holding spring 12 is attached to the pin 10 and the closed holding handle 14 of the jack assembly 1 from both sides. The handle 13 forms junction for the spring 11 and the closed holding spring 12. Further, the jack assembly 1 includes a rattle assembly comprising of a rattle lock 16, a rattle 17 associated with the rattle lock 16, a collector spring 15 associated with the rattle lock 16. The rattle lock 16 is connected to the bent retentive holder 3 through a retentive holding pin 30.

The collector spring 15 is attached to the lock 16 and the closed holding handle 14 from two ends. When the jack handle 25 is pulled the shaft 21 revolves which in turn revolves the rattle 17 stopping the jack handle 25. Following the stopping action of the jack handle 25 the rattle 17 also stops. The rattle lock 16 fixes the jack assembly 1 by fixing the rattle 17 in its place. Furthermore when the closed holding handle 14 recedes the collector spring gets activated. When the jack handle 25 is pulled second time the rattle lock 16 rises and releases the rattle 17 bringing the jack assembly 1 to its initial position.

FIG. 8 illustrates front and top view of pulley 26 provided in a jack assembly 1 (as shown in FIG. 1) according to one embodiment herein.

Figure 9:
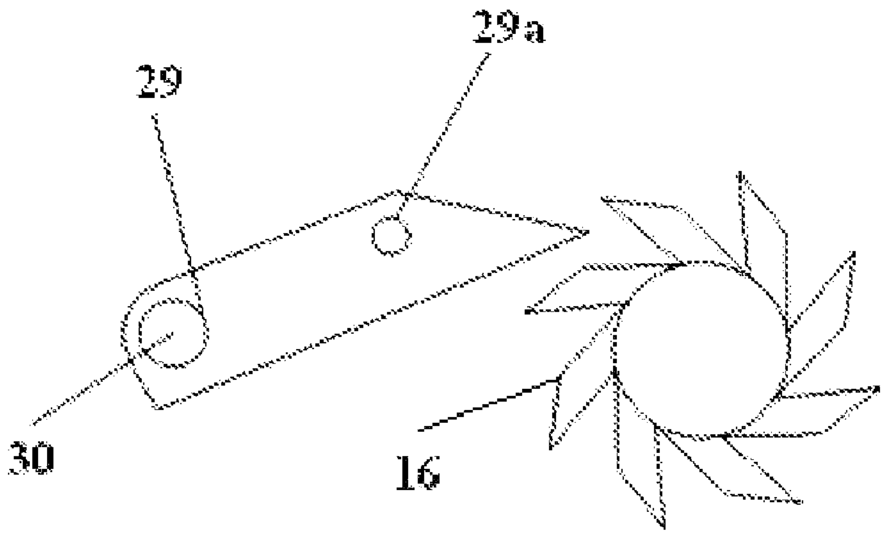
FIG. 9 illustrates a schematic side view of the rattle and rattle lock provided in the partial jack assembly according to one embodiment herein.

FIG. 9 illustrates a side view of rattle and a rattle lock provided in a jack assembly according to one embodiment herein. With respect to FIG. 9 the rattle lock 16 includes a rattle 17. The rattle lock 16 includes two holes 29*a* and 29*b*. A retentive holder 3 (as shown in FIG. 6 and FIG. 7) is attached to the rattle lock 16 through a retentive holding pin 30 by inserting the retentive holding pin 30 into the hole 29*a*.

FIG. 10 illustrates side view of ends of tailpiece included in the jack assembly according to one embodiment herein. With respect to the FIG. 10 the tail piece 19 a hole 20 for holding plurality of wire ropes. A hole 24 is provided in the tailpiece 19 for holding the tailpiece on a shaft 18 (as shown in FIG. 6).

Figure 11:
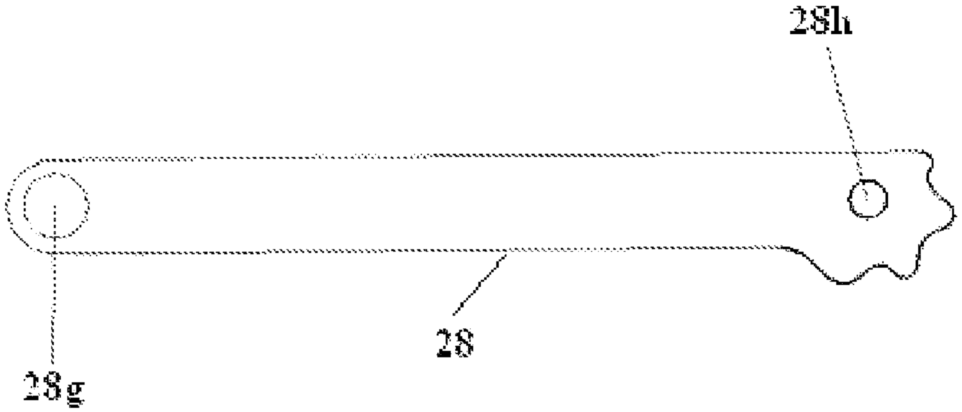
FIG. 11 illustrates a schematic view of at least one of the upper arms or lower arms in the partial jack assembly according to one embodiment herein.
Figure 12:
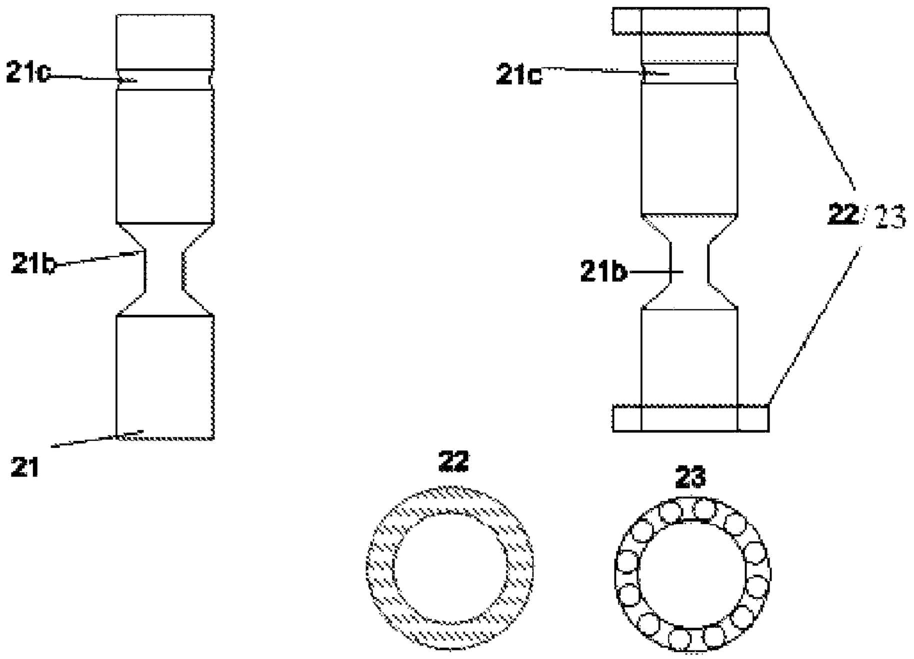
FIG. 12 illustrates a schematic view of two shafts, ball bearings and sift included in the jack assembly according to one embodiment herein.

FIG. 11 illustrates side view of one of upper arms or lower arms included in a jack assembly according to one embodiment herein. With respect to FIG. 11 the arm 28 includes a hole 28*g* for placing a shift 22 and ball bearing (as shown in FIG. 12) in the jack assembly. A hole 28*h* is provided in the arm 28 for attaching the arm to one of a base sheet 2 or a retentive sheet 4 (as shown in FIG. 1).

FIG. 12 illustrates two shafts, ball bearing and shift included in a jack assembly according to one embodiment herein. The figure includes a shaft 21, a shift 22 associated with the shaft 21, a ball bearing 23, and a rake 21*b* provided on the shaft 21. A jag 1*c* is provided for holding the shaft 21 in place and keeping the wire ropes apart.

Figure 13:
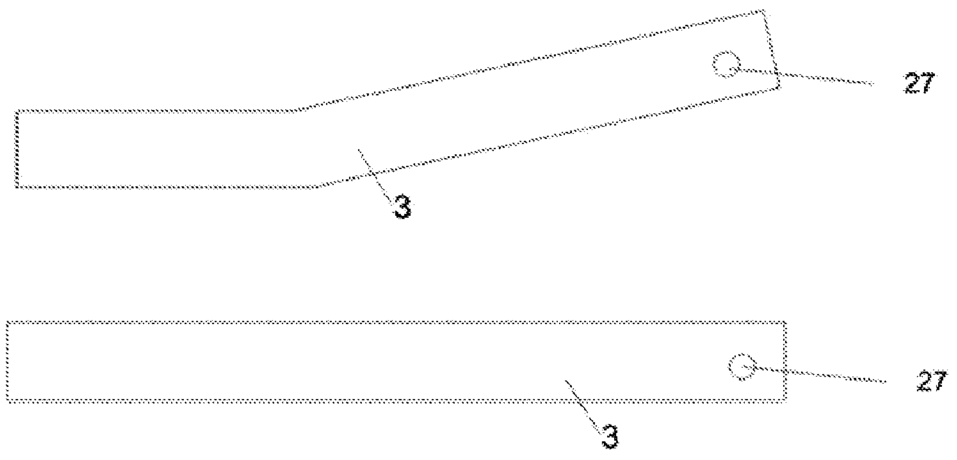
FIG. 13 illustrates a schematic front view of the retentive handle included in the partial jack assembly according to one embodiment herein.
Figure 14:
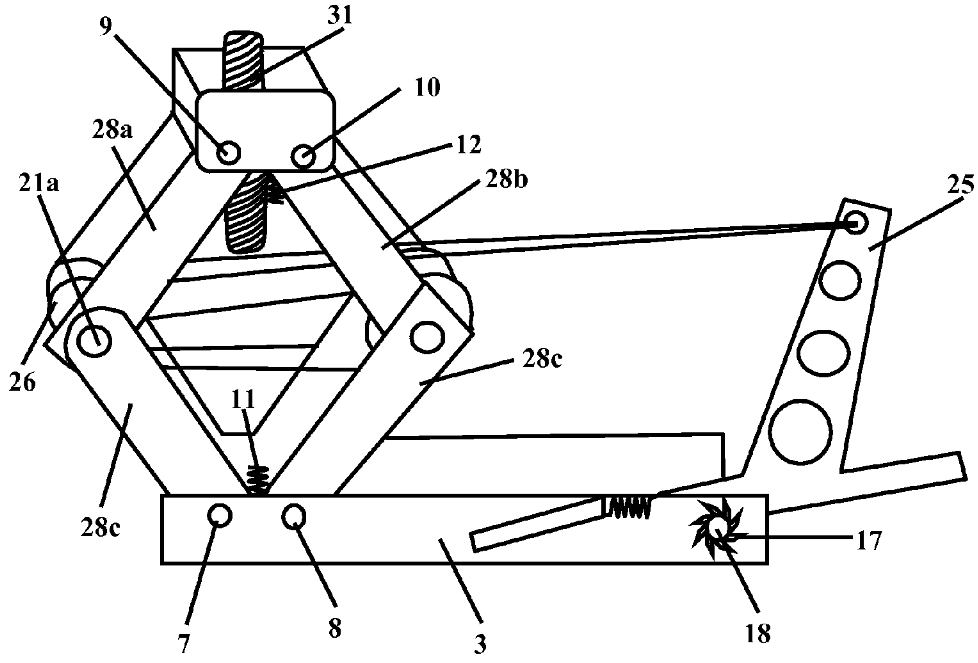
FIG. 14 shows complete invention without a spring.
Figure 15:
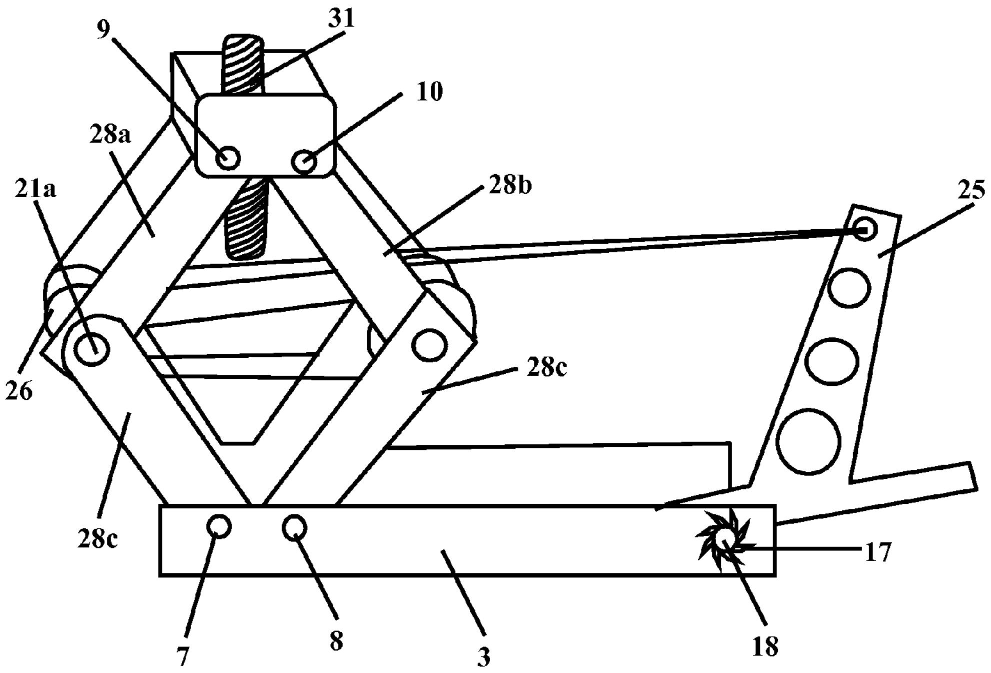
FIG. 15 shows complete invention with a spring.

FIG. 13 illustrates front view of retentive handle included in a jack assembly according to one embodiment herein. The retentive handle includes hole 27 for attaching the retentive handle 3 to a shaft 18 (as shown in FIG. 6).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A jack assembly for raising and lowering vehicles, the assembly comprising:

at least two shafts;

a base sheet;

a retentive sheet;

at least two upper arms fastened to the retentive sheet;

at least two lower arms fastened to the base sheet;

a jack handle provided on one of the at least two shafts;

a plurality of pulleys mounted on one of the at least two shafts;

a groove provided on each of the plurality of pulleys; and a plurality of wire ropes passed over the groove provided on each of the plurality of pulleys;

Wherein the jack handle is pulled up to move a first end and a second end of a wire rope passed over each of the plurality of the pulleys towards each other to make the at least two shafts to approach towards each other thereby displacing the at least two upper arms and the lower arms to lift the retentive sheet for raising the vehicles with a single pull movement of the jack handle.

2. The assembly of claim 1, further comprising:

a moving part;

a hole through which the moving part moves;

a winding regulation screw provided in the moving part;

a tail piece attached to one of the at least two shafts associated with the jack handle; and an opening provided in the tailpiece.

3. The assembly of claim 1, wherein the second end of the wire ropes is attached by a girth to the tailpiece through the opening.

4. The assembly of claim 1, wherein the at least two shafts comprises a shift or ball bearing for easy movement of the at least two upper arms and the at least two lower arms.

5. The assembly of claim 1, wherein a first hole is provided at one end of each of the at least two upper arms for placing the shift or the ball bearing and a second hole is provided at another end of each of the at least two upper arms for fastening each of the at least two upper arms to the retentive sheet.

6. The assembly of claim 1, wherein the at least two upper arms are fastened to the retentive sheet through at least two pins.

7. The assembly of claim 1, wherein a third hole is provided at one end of each of the at least two lower arms for placing the shift or the ball bearing and a fourth hole is provided at another end of each of the at least two lower arms for fastening each of the at least two lower arms to the base sheet.

8. The assembly of claim 1, wherein the at least two lower arms are fastened to the base sheet through at least two pins.

9. The assembly of claim 1 wherein a plurality of rakes are provided on one of the at least two shafts.

10. The assembly of claim 1, wherein the at least two upper arms are a first upper arm and a second upper arm and wherein the at least two lower arms are a first lower arm and a second lower arm.

11. The assembly of claim 1, wherein the first upper arm and the first lower arm are attached to each other and pivoted on one of the at least two shafts.

12. The assembly of claim 1, wherein the second upper arm and the second lower arm are attached to each other and pivoted on one of the at least two shafts.

13. The assembly of claim 1, wherein a plurality of bumps are provided on the at least two upper arms and on the at least two lower arms.

14. The assembly of claim 1, further comprising:

a first spring;

a second spring and wherein the second spring is a closed holding spring;

a handle forming junction for the first spring and the second spring; and a closed holding handle.

15. The assembly of claim 1, wherein the first spring is attached to the closed holding handle and one of the at least two pins associated with the lower arms.

16. The assembly of claim 1, wherein the second spring is attached to the closed holding handle and one of the at least two pins associated with the upper arms.

17. The assembly of claim 1, further comprises a rattle assembly and wherein the rattle assembly comprises a rattle lock, a rattle associated with the rattle lock, a third spring associated with the rattle lock and a retentive holder.

18. The assembly of claim 1, wherein one end of the third spring is attached to the rattle lock while another end of the third spring is attached to the closed holding handle and wherein the third spring is a collector spring.

19. The assembly of claim 1, wherein the rattle lock is connected to the retentive holder through a retentive holding pin.

* * * * *